United States Patent
Byun et al.

(10) Patent No.: US 12,026,909 B2
(45) Date of Patent: Jul. 2, 2024

(54) WEAKLY SUPERVISED OBJECT LOCALIZATION APPARATUS AND METHOD

(71) Applicant: UIF (University Industry Foundation), Yonsei University, Seoul (KR)

(72) Inventors: Hye Ran Byun, Seoul (KR); Wonyoung Lee, Seoul (KR); Minsong Ki, Seoul (KR); Jewook Lee, Seoul (KR); Sungho Park, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 372 days.

(21) Appl. No.: 17/526,380

(22) Filed: Nov. 15, 2021

(65) Prior Publication Data
US 2023/0098817 A1 Mar. 30, 2023

(30) Foreign Application Priority Data
Sep. 27, 2021 (KR) .......... 10-2021-0127014

(51) Int. Cl.
*G06T 7/73* (2017.01)
*G06F 18/213* (2023.01)
(Continued)

(52) U.S. Cl.
CPC .............. *G06T 7/73* (2017.01); *G06F 18/213* (2023.01); *G06N 3/088* (2013.01); *G06T 5/20* (2013.01);
(Continued)

(58) Field of Classification Search
CPC .... G06F 18/213; G06N 3/0464; G06N 3/088; G06N 3/0895; G06N 3/094;
(Continued)

(56) References Cited

U.S. PATENT DOCUMENTS

2018/0144209 A1* 5/2018 Kim .................. G06N 3/04

FOREIGN PATENT DOCUMENTS

| CN | 110659589 A | * 1/2020 | ......... G06K 9/00369 |
| KR | 10-1879207 B1 | 7/2018 | |

OTHER PUBLICATIONS

Ki et al: "In-sample Contrastive Learning and Consistent Attention for Weakly Supervised Object Localization", ACCV, 2020 (Year: 2020).*

(Continued)

*Primary Examiner* — Ruiping Li
(74) *Attorney, Agent, or Firm* — Paratus Law Group, PLLC

(57) ABSTRACT

A weakly supervised object localization apparatus includes: a feature map generator configured to generate a feature map X by performing a first convolution operation on an input image; an erased feature map generator configured to generate an attention map A through the feature map X and generate an erased feature map –X by performing a masking operation on the input image through the attention map A; a final map generator configured to generate a final feature map F and a final erased feature map –F, respectively, by performing a second convolution operation on the feature map X and the erased feature map –X; and a contrastive guidance determiner configured to determine contrastive guidance for a foreground object in the input image based on the final feature map F and the final erased feature map –F.

14 Claims, 8 Drawing Sheets

(51) Int. Cl.
  *G06N 3/088* (2023.01)
  *G06T 5/20* (2006.01)
  *G06T 7/11* (2017.01)
  *G06T 7/194* (2017.01)
  *G06V 10/25* (2022.01)

(52) U.S. Cl.
  CPC ............... *G06T 7/11* (2017.01); *G06T 7/194* (2017.01); *G06V 10/25* (2022.01); *G06T 2207/20081* (2013.01); *G06T 2207/20084* (2013.01)

(58) Field of Classification Search
  CPC . G06T 2207/20081; G06T 2207/20084; G06T 5/20; G06T 7/11; G06T 7/194; G06T 7/73; G06V 10/25; G06V 10/7784; G06V 10/82
  See application file for complete search history.

(56) References Cited

OTHER PUBLICATIONS

Zhang et al, "Adversarial Complementary Learning for Weakly Supervised Object Localization", CVPR, 2018 (Year: 2018).*
Zhang et al, "Self-produced Guidance for Weakly-supervised Object Localization", ECCV, 2018. (Year: 2018).*

* cited by examiner

WEAKLY SUPERVISED OBJECT LOCALIZATION APPARATUS AND METHOD

ACKNOWLEDGEMENT

The present patent application has been filed as a research project as described below.

[National Research Development Project Supporting the Present Invention]
 [Project Serial No.] 1711126082
 [Project No.] 2020-0-01361-002
 [Department] Ministry of Science and ICT
 [Project management (Professional) Institute] Institute of Information & Communication Technology Planning & Evaluation
 [Research Project Name] Information & Communication Broadcasting Research Development Project
 [Research Task Name] Artificial Intelligence Graduate School Support (Yonsei University)
 [Contribution Ratio] 1/3
 [Project Performing Institute] Yonsei University Industry Foundation
 [Research Period] 2021.01.01~2021.12.31

[National Research Development Project Supporting the Present Invention]
 [Project Serial No.] 1711134177
 [Project No.] 2019R1A22C2003760
 [Department] Ministry of Science and ICT
 [Project management (Professional) Institute] National Research Foundation of Korea
 [Research Project Name] Mid-level Researcher Support Project
 [Research Task Name] A Study on Zero-shot Learning Technology for Creating and Recognizing Images and Videos of Complex Categories You See for the First Time Through Automatic Generation of Characteristic Information
 [Contribution Ratio] 1/3
 [Project Performing Institute] Yonsei University
 [Research Period] 2021.03.01~2022.02.28

[National Research Development Project Supporting the Present Invention]
 [Project Serial No.] 1711125843
 [Project No.] 2018-0-00769-004
 [Department] Ministry of Science and ICT
 [Project management (Professional) Institute] Institute of Information & Communication Technology Planning & Evaluation
 [Research Project Name] SW computing industry source technology development (R&D, informatization)
 [Research Task Name] Neuromorphic computing SW platform technology development for artificial intelligence systems
 [Contribution Ratio] 1/3
 [Project Performing Institute] Electronics and Telecommunications Research Institute
 [Research Period] 2021.01.01~2021.12.31

CROSS-REFERENCE TO PRIOR APPLICATION

This application claims priority to Korean Patent Application No. 10-2021-0127014 (filed on Sep. 27, 2021), which is hereby incorporated by reference in its entirety.

BACKGROUND

The present disclosure relates to an object localization technology, and more particularly, to a weakly supervised object localization apparatus and method capable of detecting an accurate region of an object through contrastive guidance for the object in an image based on Convolutional Neural Network (CNN) learning.

Object localization is a computer vision technology that classifies and localize a single object in an image to identify the object on the image. Deep learning models such as CNNs are used to automatically learn the intrinsic features of a given object for object recognition.

Object localization methods through deep learning are designed as methods of learning an already-created data set and actual information on a location of an object included in the data set together. A learning model used for such deep learning is called a fully supervised method. Although the method of detecting the position of an object through the fully supervised learning method has excellent performance, it has the disadvantage that actual information about the position of the object must be included in the learning process. There is a problem that it takes a lot of time to create a label for it.

Therefore, recently, various studies have been conducted through the method of weakly supervised in addition to the fully supervised learning method. Weak supervised learning is a method of generating a deep learning prediction model by learning only an image and a class label therefor in a learning process. Compared with fully supervised learning, weakly supervised learning has an advantage in that it can reduce a lot of human labor and material waste because a label for the actual location of an object is not required.

However, in an existing method for object localization through weak supervised learning, when a classifier in a convolutional neural network (CNN) classifies an image to which class the image belongs, only a most characteristic part is determined and recognized, and thus, object localization efficiency is low.

RELATED ART DOCUMENT

Patent Document (Patent Document 1) Korean Patent No. 10-1879207 (Jul. 11, 2018)

SUMMARY

The present disclosure provides a weakly supervised object localization apparatus and method capable of detecting an accurate region of an object through contrastive guidance for the object in an image based on convolutional neural network (CNN) learning.

The present disclosure also provides a weakly supervised object localization apparatus and method capable of improving object localization efficiency by localizing the entire foreground of the object and erasing the background to accurately detect the region of the object.

The present disclosure also provides a weakly supervised object localization apparatus and method that propose an adversarial erasing (AE)-based new weakly supervised object localization (WSOL) framework that is capable of improving object localization performance.

In an aspect, there is provided a weakly supervised object localization apparatus, and the apparatus includes: a feature map generator configured to generate a feature map X by performing a first convolution operation on an input image; an erased feature map generator configured to generate an attention map A through the feature map X and generate an erased feature map −X by performing a masking operation on the input image through the attention map A; a final map generator configured to generate a final feature map F and a final erased feature map −F, respectively, by performing a second convolution operation on the feature map X and the erased feature map −X; and a contrastive guidance determiner configured to determine contrastive guidance for a foreground object in the input image based on the final feature map F and the final erased feature map −F.

The erased feature map generator may be further configured to generate the attention map A through channel-wise pooling of the feature map X.

The erased feature map generator may be further configured to perform the masking operation on the input image by generating a mask for a most characteristic part in the attention map A.

The final map generator may be further configured to activate different regions in the input image through the final feature map F and the final erased feature map −F so that the foreground object moves away from background.

The final map generator may be further configured to generate foreground masks Mfg and −Mfg and background masks Mbg and −Mbg through attention maps AF and −AF that are based on channel-wise pooling of the final feature map F and the final erased feature map −F.

The final map generator may be further configured to generate foreground feature maps Ffg and −Ffg and background feature maps Fbg and −Fbg based on the foreground masks Mfg and −Mfg and the background masks Mbg and −Mbg.

The final map generator may be further configured to generate multidimensional feature vectors Zfg, Zbg, −Zfg, and −Zbg by projecting the foreground feature maps Ffg and −Ffg and the background feature maps Fbg and −Fbg onto a normal embedding space.

The final map generator may be further configured to generate a key k, a query q, and a value v by performing a third convolution operation on the final feature map F and the final erased feature map −F, and improve performance of the final feature map F and the final erased feature map −F by performing a product operation of the key k, the query q, and the value v with a weight matrix W.

The contrastive guidance determiner may be further configured to determine the contrastive guidance, so that a distance between foreground feature vectors Zfg and −Zfg is reduced while a distance between background feature vectors Zbg and −Zbg of the respective foreground feature vector Zfg and −Zfg among multidimensional feature vectors Zfg, Zbg, −Zfg, and −Zbg generated based on the final feature map F and the final erased feature map −F is increased.

In another aspect, there is provided a weakly supervised object localization method, and the method includes: a feature map generating operation of generating a feature map X by performing a first convolution operation on an input image; an erased feature map generating operation of generating an attention feature map A through the feature map X and generating an erased feature map −X by performing a masking operation on the input image through the attention map A; a final map generating operation of generating a final feature map F and a final erased feature map −F, respectively, by performing a second convolution operation on the feature map X and the erased feature map −X; and a contrastive guidance determining operation of determining contrastive guidance for a foreground object in the input image based on the final feature map F and the final erased feature map −F.

The erased feature map generating operation may include generating the attention map A through channel-wise pooling of the feature map X, and performing the masking operation on the input image by generating a mask for a most characteristic part in the attention map A.

The final map generating operation may include generating foreground masks Mfg and −Mfg and background masks Mbg and −Mbg through attention maps AF and −AF that are based on channel-wise pooling of the final feature map and the final erased feature map −F, generating foreground feature maps Ffg and −Ffg and background feature maps Fbg, −Fbg based on the foreground masks Mfg and −Mfg and the background masks Mbg and −Mbg, and generating multidimensional feature vectors Zfg, Zbg, −Zfg, and −Zbg by projecting the foreground feature maps Ffg and −Ffg and the background feature maps Fbg and −Fbg onto a normal embedding space.

The final map generating operation may include generating a key k, a query q, and a value v by performing a third convolution operation on the final feature map F and the final erased feature map −F, and improving performance of the final feature map F and the final erased feature map −F by performing a product operation of the key k, the query q, and the value v with a weight matrix W.

The contrastive guidance determining operation may include determining the contrastive guidance, so that a distance between foreground feature vectors Zfg and −Zfg is reduced while a distance between background feature vectors Zbg and −Zbg of the respective foreground feature vector Zfg and −Zfg among multidimensional feature vectors generated based on the final feature map F and the final erased feature map −F is increased.

The disclosed technique may have the following effects. However, since a specific embodiment may provide all the following effects or a few of them, the scope of the disclosure is not limited thereto.

The weakly supervised object localization apparatus and method according to an embodiment of the present disclosure may detect an accurate region of an object through contrastive guidance for the object in an image based on convolutional neural network (CNN) learning.

The weakly supervised object localization apparatus and method according to an embodiment of the present disclosure may improve object localization efficiency by localizing the entire foreground of the object and erasing the background to accurately detect the region of the object.

The weakly supervised object localization apparatus and method according to an embodiment of the present disclosure may propose an adversarial erasing (AE)-based new weakly supervised object localization (WSOL) framework that is capable of improving object localization performance.

DETAILED DESCRIPTION

Figure 1:
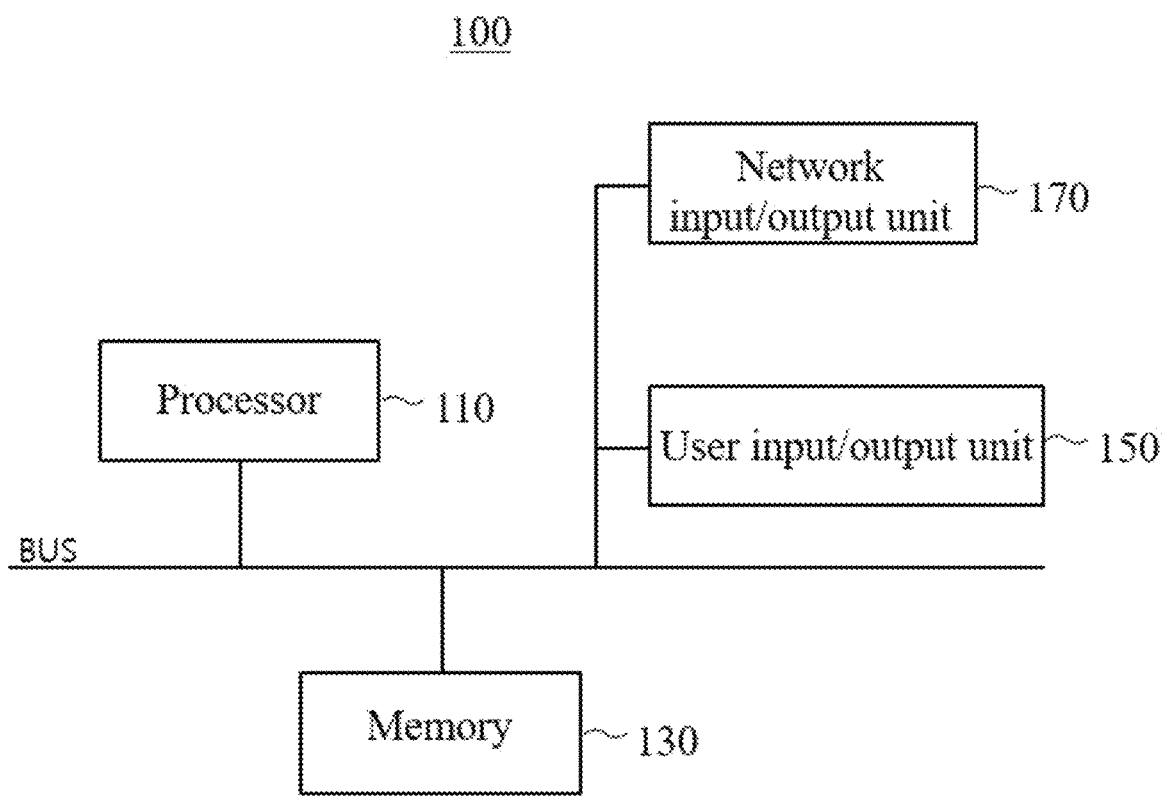
FIG. 1 is a diagram illustrating a system configuration of a weakly supervised object localization apparatus according to an embodiment of the present disclosure.

Since the descriptions of the present disclosure are only presented to describe embodiments whose purpose is to describe the structures and/or functions of the present disclosure, it should not be construed that the scope of the present disclosure is limited to the embodiments set forth herein. That is, since various modifications to the embodiments may be made, and the embodiments may have different forms, it should be understood that the scope of the present disclosure may include equivalents which can implement the technical spirit of the present disclosure. Further, it should be understood that since a specific embodiment should include all objects or effects or include only the effect, the scope of the present disclosure is limited by the object or effect.

Meanwhile, the meaning of terms described herein should be construed as follows:

Terms such as "first" and "second" are only used to distinguish one element from the other, and the scope the present disclosure should not be limited by these terms. For instance, the first element can be named the second element, and similarly the second element may be named the first element.

When one element is described as being "connected" to another element, it shall be construed as being connected to the other element directly but also as possibly having another element in between. On the other hand, if one element is described as being "directly connected" to another element, it shall be construed that there is no other element in between. Meanwhile, other expressions which describe the relationships between elements, i.e., "between" and "directly between" or "adjacent to" and "directly adjacent to," should be construed in the same manner.

Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or addition of one or more other characteristics, numbers, steps, operations, elements, parts or combinations thereof.

Reference characteristics (e.g., a, b, c, etc.) related to steps are used for convenience of description, and are not intended to describe the sequence of the steps. The steps may be performed in different sequences, as long as a specific sequence is not specifically described in the context. That is, the steps may be performed in a specified sequence, may be performed simultaneously, or may be performed in a reverse sequence.

The present disclosure can be implemented as a computer-readable code on a computer-readable recording medium and the computer-readable recording medium includes all types of recording devices for storing data that can be read by a computer system. Examples of the computer readable recording medium include a ROM, a RAM, a CD-ROM, a magnetic tape, a floppy disk, an optical data storage device, and the like and further include a device implemented as a type of a carrier wave (e.g., transmission through the Internet). Further, the computer readable recording media may be stored and executed as codes which may be distributed in the computer system connected through a network and read by a computer in a distribution method.

If it is not contrarily defined, all terms used herein have the same meanings as those generally understood by those skilled in the art. Terms which are defined in a generally used dictionary should be interpreted to have the same meaning as the meaning in the context of the related art, and are not interpreted as an ideal meaning or excessively formal meanings unless clearly defined in the present application.

FIG. 1 is a diagram illustrating a system configuration of a weakly supervised object localization apparatus according to an embodiment of the present disclosure.

Referring to FIG. 1, a weakly supervised object localization apparatus 100 may be configured as a computing system including a processor 110, a memory 130, a user input/output unit 150, and a network input/output unit 170.

The processor 110 may execute a procedure for processing each operation in the process of operation of the weakly supervised object localization apparatus 100, may manage the memory 130 that is read or written throughout the process, and may schedule a synchronization time between a volatile memory and a non-volatile memory in the memory 130. The processor 110 may control the overall operation of the weakly supervised object localization apparatus 100, and may be electrically connected to the memory 130, the user input/output unit 150, and the network input/output unit 170 to control the flow of data therebetween. The processor 110 may be implemented as a central processing unit (CPU) of the weakly supervised object localization apparatus 100.

The memory 130 may include an auxiliary memory device implemented as a non-volatile memory, such as a solid state drive (SSD) or a hard disk drive (HDD) and used to store overall data required for the weakly supervised object localization apparatus 100, and may include a main memory implemented as a volatile memory such as a random access memory (RAM).

The user input/output unit 150 may include an environment for receiving a user input and an environment for outputting specific information to the user. For example, the user input/output unit 150 may include an input device including an adapter, such as a touch pad, a touch screen, an on-screen keyboard, or a pointing device, and an output device including an adapter, such as a monitor or a touch screen. In one embodiment, the user input/output unit 150 may correspond to a computing device to be accessed through a remote connection, and in this case, the weakly supervised object localization apparatus 100 may serve as an independent server.

The network input/output unit 170 may include an environment for connecting to an external device or system through a network. For example, the network input/output unit 170 may include an adapter for communication such as a local area network (LAN), a metropolitan area network (MAN), a wide area network (WAN), and a Value Added Network (VAN).

Figure 2:
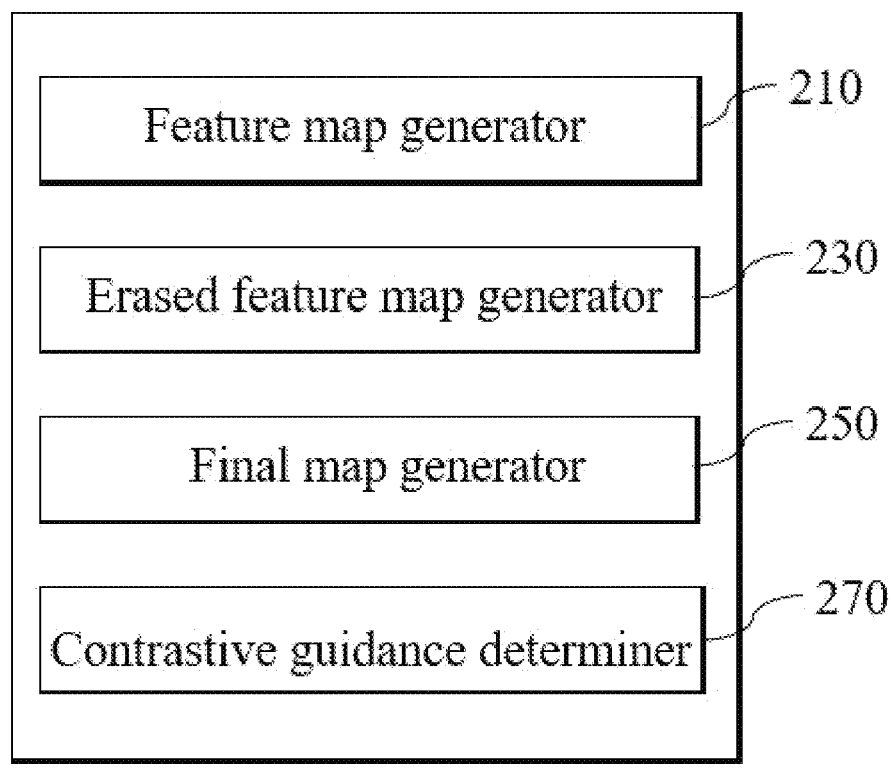
FIG. 2 is a diagram illustrating a functional configuration of a process in the weakly supervised object localization apparatus of FIG. 1.

FIG. 2 is a diagram illustrating a functional configuration of a processor in the weakly supervised object localization apparatus of FIG. 1.

Referring to FIG. 2, the weakly supervised object localization apparatus 100 may include a feature map generator 210, an erased feature map generator 230, a final map generator 250, and a contrastive guidance determiner 270. The feature map generator 210, the erased feature map generator 230, the final map generator 250, and the contrastive guidance determiner 270 may be connected to each other.

The feature map generator 210 may generate a feature map X by performing a first convolution operation on an input image. The feature map generator 210 may be implemented in a convolutional neural network (CNN) structure and generate the feature map X for each class by passing the image.

The CNN structure is a pooling layer that maintains the shape of input and output data of each layer, extracts and learns features of an image with multiple filters, and collects and enhances features of the extracted image. The CNN structure has less learning parameters compared to a general artificial neural network. In CNN, a filter traverses input data for image feature extraction, calculates convolution, and generates a feature map using the calculation result. The feature map may contain location information on the original image.

The erased feature map generator 230 may generate an attention map A, and generate an erased feature map $-X$ by performing a masking operation on an input image through the attention map A. The erased feature map generator 230 may generate the attention map A through channel-wise pooling. In one embodiment, the erased feature map generator 230 may generate the attention map A through channel-wise pooling of the feature map X in the middle of the backbone of the feature map generator 210. The feature map generator 230 may generate a mask for a most characteristic part in the generated attention map A and perform a masking operation on the input image. The feature map generator 230 may multiply a threshold value $\theta_d$ by the highest value in the attention map A. When the threshold value $\theta_d$ is greater than the multiplied value, the feature map generator 230 may regard the corresponding part as a most characteristic pixel part and generate a mask for the corresponding pixel part. The feature map generator 230 may generate a mask through Equation 1 below.

$$M_{pix} = \mathbb{1}[A > \tau_d], \text{ where } \tau_d = \max(A) \times \theta_d \qquad \text{[Equation 1]}$$

Here, Mpix corresponds to a mask, and A corresponds to an attention map.

In order to extend a most characteristic pixel part in the attention map A in units of region, the feature map generator 230 may generate a mask M for each region by multiplying a max pooling layer having a kernel size of S×S by a mask Mpix. The erased feature map generator 230 may generate an erased feature map $-X$ by multiplying the generated mask M for each region by the original feature map X.

The final map generator 250 may generate a final feature map F and a final erased feature map $-F$, respectively, by performing a second convolution operation on the feature map X and the erased feature map $-X$. In one embodiment, the final map generator 250 may generate the final feature map F and the final erased feature map $-F$, respectively, by passing the feature map X and the erased feature map $-X$ through remaining convolutional layers of a backbone network. As learning progresses, an erased area may become wider in the erased feature map $-X$ and the final map generator 250 may further activate the entire region of the object in the final feature map F and the final erased feature map $-F$.

The final map generator 250 may move a foreground object away from the background by activating different regions in the input image through the final feature map F and the final erased feature map $-F$. The final map generator 250 may generate foreground masks Mfg and $-$Mfg and background masks Mbg and $-$Mbg through attention maps AF and $-$AF that are based on channel-wise pooling of the final feature map F and the final erased feature map $-F$. In one embodiment, the final map generator 250 may generate the attention maps AF and $-$AF by using channel-wise pooling of the final feature map F and the final erased feature map $-F$, and separate the foreground and the background by generating masks in the respective attention maps using a threshold value. Here, the final map generator 250 may generate a foreground feature map and a background feature map by multiplying the generated masks by the final feature map F. The final map generator 250 may generate a foreground mask and a background mask through Equation 2 below.

$$M_{fg} = \mathbb{1}[A_F > \tau_{fg}], M_{bg} = \mathbb{1}[A_F < \tau_{bg}] \qquad \text{[Equation 2]}$$

Here, Mfg corresponds to the foreground mask, Mbg corresponds to the background mask, and AF corresponds to the channel-wise pooled attention map. τfg and τbg are predefined threshold values.

The final map generator 250 may generate foreground feature maps Ffg and $-$Ffg and background feature maps Fbg and $-$Fbg based on the foreground masks Mfg and $-$Mfg and the background masks Mbg and $-$Mbg. In one embodiment, the final map generator 250 may generate a foreground feature map and a background feature map through Equation 3 below.

$$F_{fg} = F \odot M_{fg}, F_{bg} = F \odot M_{bg} \qquad \text{[Equation 3]}$$

Here, Ffg corresponds to the foreground feature map, and Fbg corresponds to the background feature map and is generated by multiplying the feature map F by each mask M.

The final map generator 250 may generate multidimensional feature vectors Zfg, Zbg, $-$Zfg, and $-$Zbg by projecting the foreground feature maps Ffg and $-$Ffg and the background feature maps Fbg and $-$Fbg onto a normal embedding space. In one embodiment, the final map generator 250 may generate 128-dimensional vectors by projecting the generated foreground and background feature maps Ffg, Fbg, $-$Ffg, and $-$Fbg onto a normal embedding space.

The final map generator 250 may generate a key, a query, and a value by performing a third convolution operation on the final feature map F and the final erased feature map $-F$, and improve performance of the final feature map F and the final erased feature map $-F$ by performing a product operation of the key, the query, and the value with a weight matrix W. In one embodiment, the final map generator 250 may generate the weight matrix W through a whitened dot product operation of the key k and the query q, and the weight matrix W may be defined through Equation 4 below.

$$W = \sigma((q_i - \mu_q)^T (k_j - \mu_k)) \qquad \text{[Equation 4]}$$

Here, σ is a softmax function, and μ is the average of pixels i and j in the query q and key k.

The improved feature map F', which is the final map generated by the final map generator 250, may be generated through Equation 5 below.

$$F' = F \oplus h(v \otimes W) \qquad \text{[Equation 5]}$$

Here, h corresponds to a 1×1 convolutional layer following batch normalization.

The contrastive guidance determiner 270 may determine contrastive guidance for a foreground object in the input image based on the final feature map F and the final erased feature map −F. The contrastive guidance determiner 270 may determine constative guidance, so that a distance between the foreground feature vectors Zfg and −Zfg is reduced while a distance between the background feature vectors Zbg and −Zbg of the respective foreground feature vectors Zfg and −Zfg among the multidimensional feature vectors Zfg, Zbg, −Zfg, and −Zbg generated based on the final feature map F and the final erased feature map −F is increased. In one embodiment, the contrastive guidance determiner 270 may be trained using a constative guidance loss so that the foreground feature vector Zfg approaches the foreground erased feature factor −Zfg and moves away from the background feature vector Zbg while the foreground erased feature vector −Zfg approaches the foreground feature vector Zfg and moves away from the background erased feature vector −Zbg. The contrastive guidance loss may be defined through Equation 6 below.

$$\mathcal{L}_{cg} = \{\max[\|(z_{fg} - \bar{z}_{fg})\|^2 - \|(z_{fg} - z_{bg})\|^2 + m, \ 0] + \max[\|(\bar{z}_{fg} - z_{fg})\|^2 - \|(\bar{z}_{fg} - \bar{z}_{bg})\|^2 + m, \ 0]\}$$  [Equation 6]

Here, $\mathcal{L}_{cg}$ corresponds to the contrastive guidance loss and m corresponds to the margin.

The contrastive guidance loss may optimize quadruple relationships (foreground and background feature maps of original and erased branches) by utilizing complementary discovered regions in a target object. Thus, it is possible to guide the discovery of the entire object in a correct range.

Figure 3:
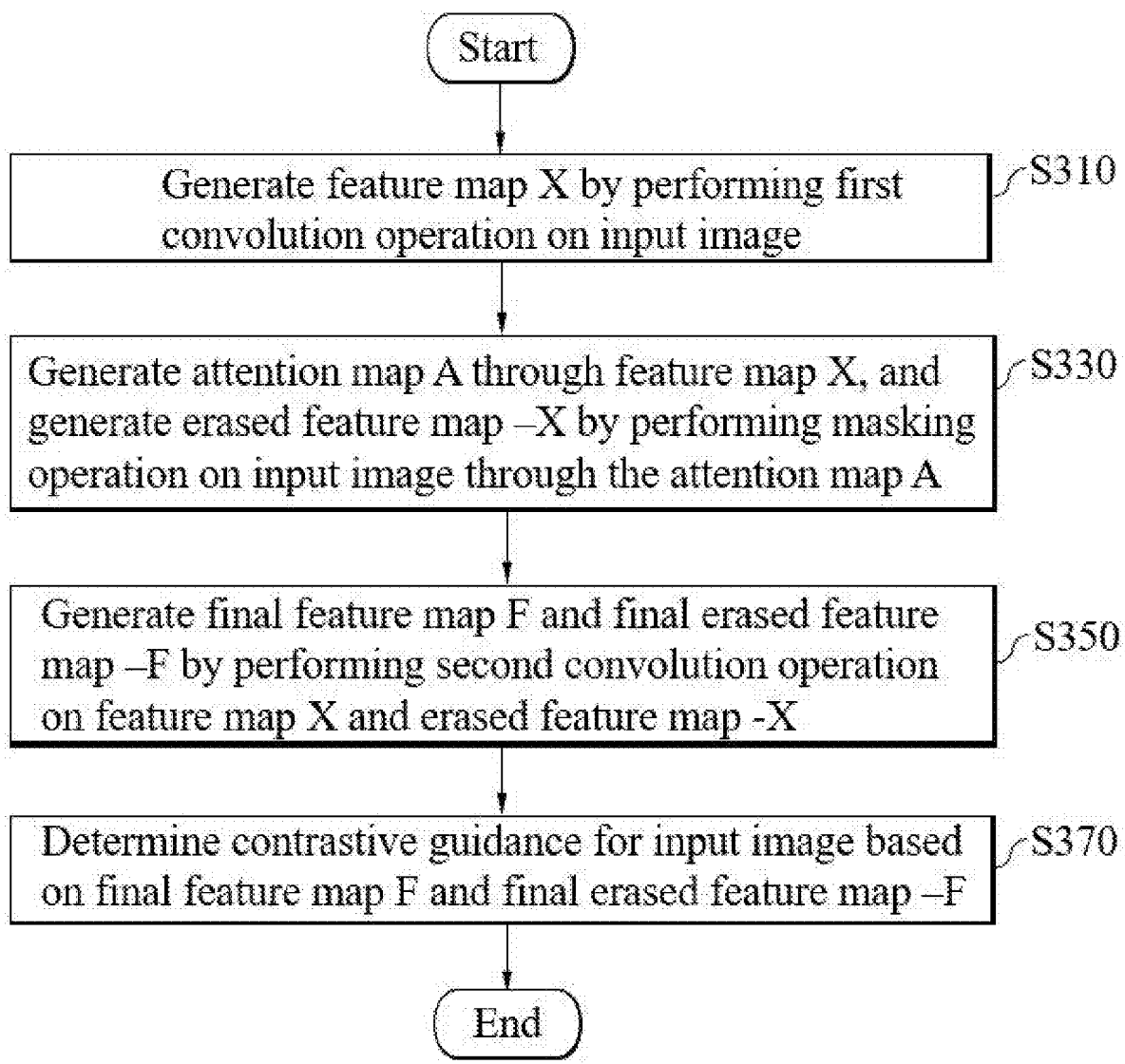
FIG. 3 is a flowchart illustrating a weakly supervised object localization process performed by the weakly supervised object localization apparatus of FIG. 2.

FIG. 3 is a flowchart illustrating a weakly supervised object localization process performed by the weakly supervised object localization apparatus of FIG. 2.

Referring to FIG. 3, the weakly supervised object localization apparatus 100 may generate a feature map X by performing a first convolution operation on an input image through the feature map generator 210 (in operation S310). The weakly supervised object localization apparatus 100 may generate an attention map A through the feature map X using the erased feature map generator 230, and may generate an erased feature map −X by performing a masking operation on the input image through the attention map A (in operation S330). The weakly supervised object localization apparatus 100 may generate a final feature map F and a final erased feature map −F, respectively, by performing a second convolution operation on the feature map X and the erased feature map −X using the final map generator 250 (in operation S350). The weakly supervised object localization apparatus 100 may determine contrastive guidance for a foreground object in the input image based on the final feature map F and the final erased feature map −F using the contrastive guidance determiner 270 (in operation S370).

Figure 4:
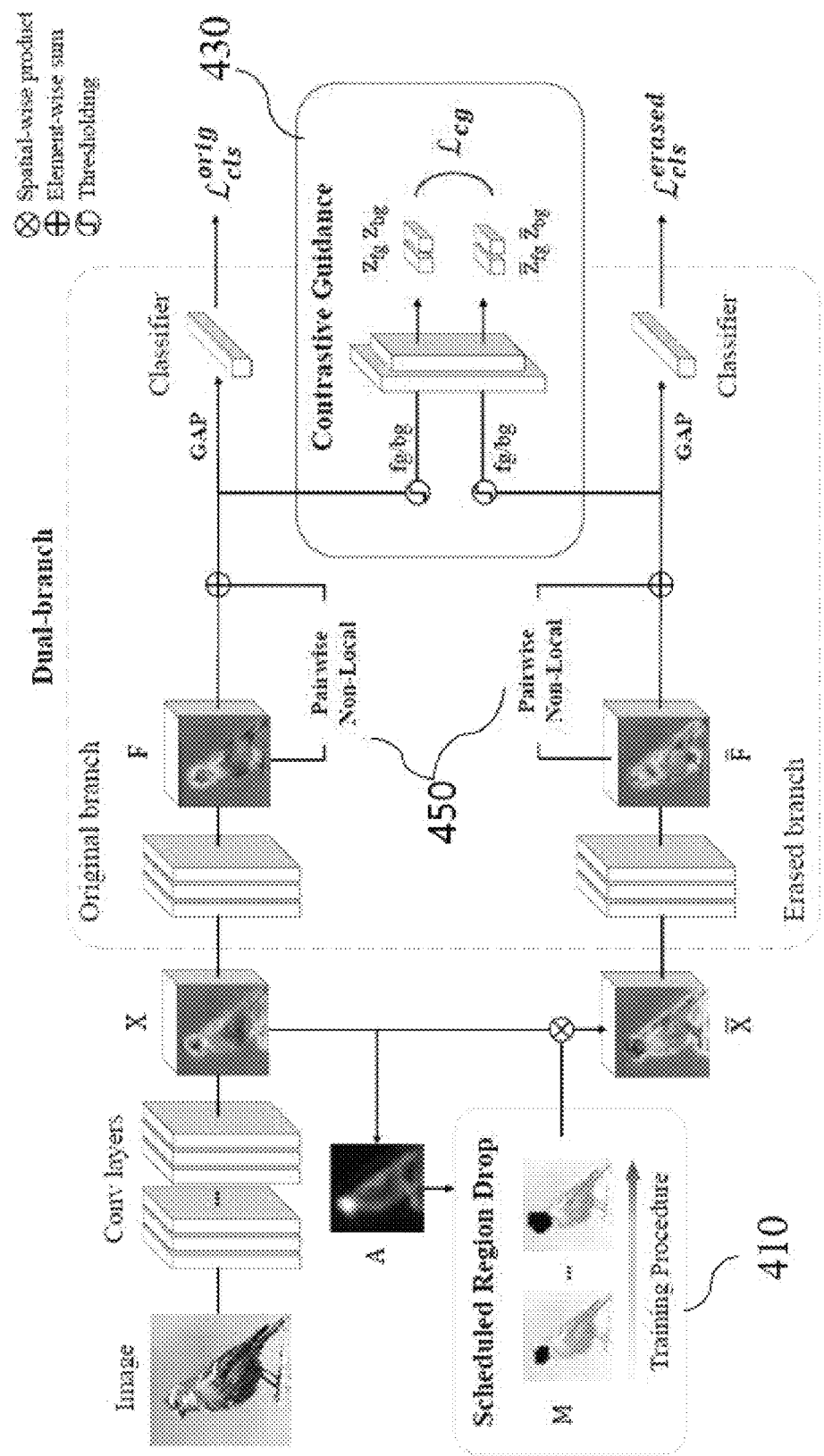
FIG. 4 is a diagram illustrating an overall framework for weakly supervised object localization according to the present disclosure.

FIG. 4 is a diagram illustrating an overall framework for weakly supervised object localization according to the present disclosure.

In order to overcome performance degradation in existing weakly supervised object localization methods, i.e., adversarial erasing (AE) methods such as class activation mapping (CAM), Hide-and-Seek (HaS), Adversarial Complementary Learning (ACoL), Attention-based Dropout Layer (ADL), and Erasing Integrated Learning (EIL), the present disclosure proposes an AE-based new weakly supervised object localization (WSOL) framework.

As shown in FIG. 4, a WSOL framework 400 according to the present disclosure is composed of three key elements that are a scheduled region drop (SRD) component 410, a contrastive guidance (CG) component 430, and a pairwise non-local (PNL) component 450. The WSOL framework 400 utilizes a classification network and is trained with a contrastive guidance loss and a classification loss using only a class label.

The SRD component 410 facilitates the network to effectively discover a less informative region by gradually erasing a most distinct part in the region-level original feature map. The SRD component 410 generates an erased feature map −X that is an input to an erased branch. This branch shares a weight of the original branch. The network feeds and forwards the original and erased feature maps X and −X at the same time and outputs the final feature maps F and −F to search for a complementary region.

The CG component 430 encourages foreground features of dual branches to be pulled together to move away from respective background features. This allows a model to learn representation of the foreground as distinct from the background, preventing activation from extending to the background.

The PNL component 450 also learns relationships between pixels in a feature map to accelerate the network so as to discover other relevant parts of a most unique region. The PNL component 450 generates an improved feature map by learning contextual information on pixel relationships. The improved feature map is provided as an input to the contrastive guidance for calculating a constative loss. The contrastive guidance loss $\mathcal{L}_{cg}$ guides the network to search for the entire object area without spreading the activation map to the background.

Each component included in the WSOL framework 400 according to the present disclosure will be described in more detail below.

SRD (Scheduled Region Drop)

An existing WSOL method using adversarial erasure generates an erased feature map by erasing a most distinct part at a pixel level. However, it is difficult to completely remove pixels adjacent to a most distinct part using only a pixel-level drop. These remaining information pixels prevent an erased branch from discovering a complementary region (i.e., a less distinct part of a target object). In order to more effectively remove a differentiated region, a region-by-region erasing strategy is proposed.

First, an attention map $A \in \mathbb{R}^{1 \times H \times W}$ of the original feature map X is obtained through channel-wise pooling. Then, a pixel-level binary mask $M_{pix} \in \mathbb{R}^{1 \times H \times W}$ is generated as follows.

$$M_{pix} = \mathbb{1}[A > \tau_d], \text{ where } \tau_d = \max(A) \times \theta_d$$

Here, τd is expressed by multiplication of the highest value of the attention map A and a predefined drop threshold value θd.

A region drop mask M is generated by increasing each pixel of Mpix to the size of a $(S \times S)^2$ region. Specifically, a maximum pooling layer having a kernel size of (S, S) is applied to Mpix.

Lastly, the erased feature map −X is generated by spatial-wise multiplication between the feature map X and the mask M. Both the feature map X and the erased feature map $\overline{X}$ are simultaneously fed to a subsequent layer of the network, which share the weight. In addition, it is observed that a fixed drop threshold $\theta_d$ has caused unstable performance. In the erased branch, it is hard to classify in an early training phase because a most distinct part in a wide range (i.e., a local-level drop) is discarded. In order to solve this problem, a reduction threshold is decreased linearly from 1 to $\theta_d$ so that a discrepancy between the dual branches at the start of training. Overall, the SRD component 410 gradually increases an erased region and successfully extends activation to a less distinct region, as shown in FIG. 5.

Figure 5:
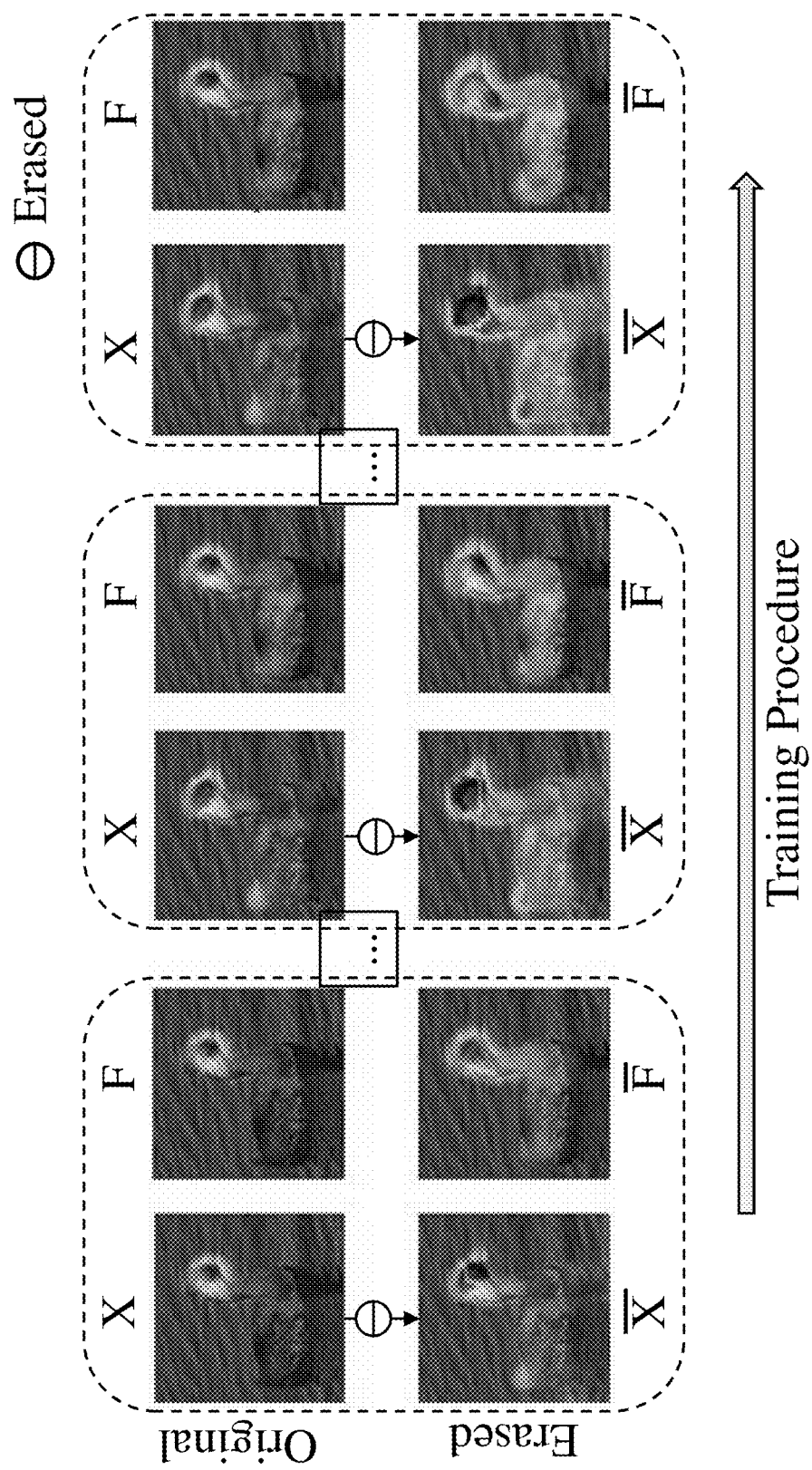
FIG. 5 is a diagram illustrating activation change in feature maps of an original branch and an erased branch.

FIG. 5 is a diagram illustrating activation change in feature maps of an original branch and an erased branch.

In FIG. 5, as learning progresses, an erased region in the erased feature map $\bar{X}$ becomes wider and the entire region of the object is further activated in the final feature map F and the final erased feature map $\bar{F}$.

Contrastive Guidance (CG)

Constative learning aims to learn meaningful representations by attracting positive pairs and pushing negative pairs. Similarly, in order to use this constative learning concept, the foreground is configured as a positive pair and the background is configured as a negative pair, as shown in FIG. 6.

Figure 6:
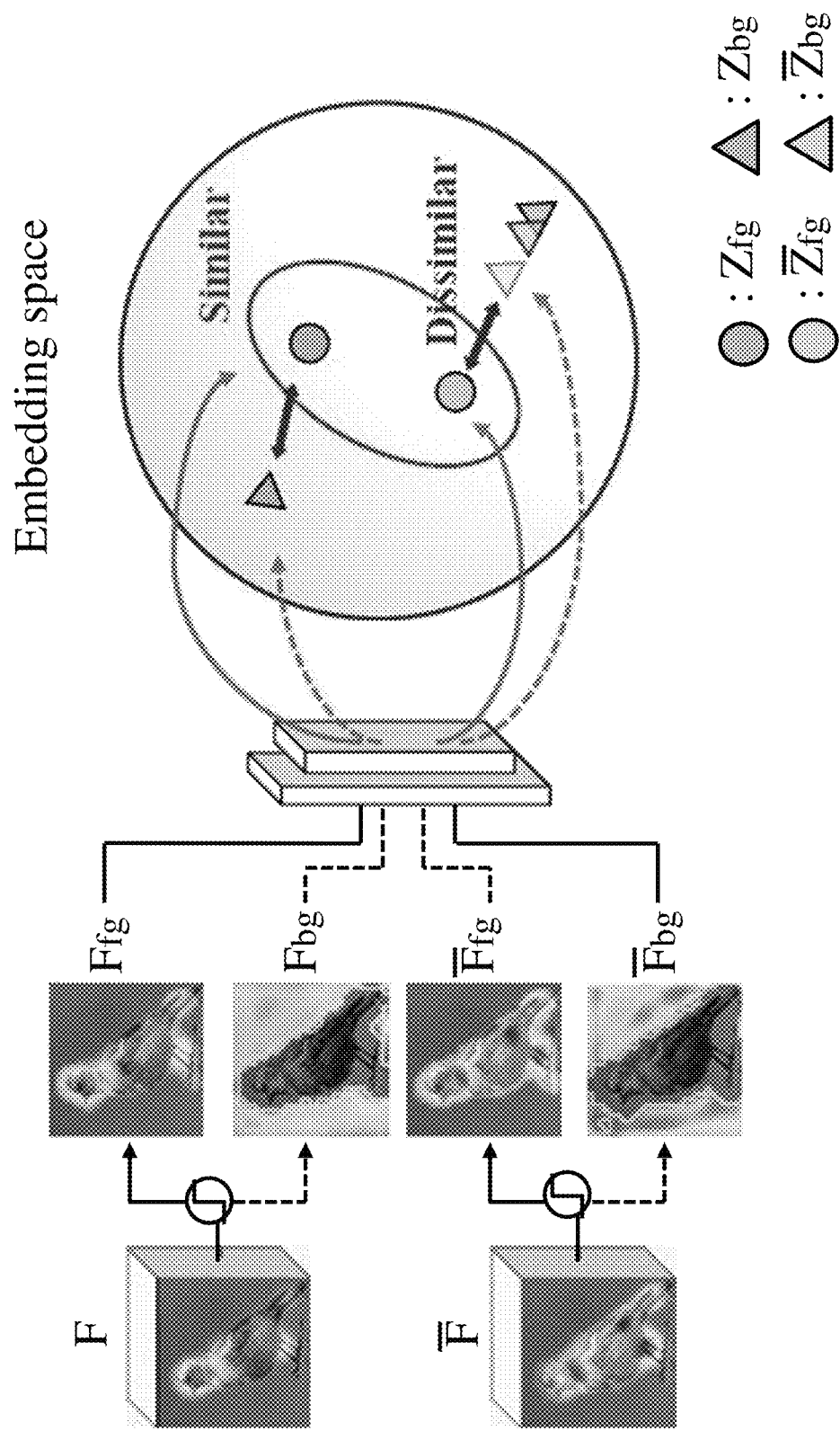
FIG. 6 is a diagram illustrating multidimensional vectors being generated by projecting foreground and background feature maps onto a normal embedding space.

FIG. 6 is a diagram illustrating multidimensional vectors being generated by projecting foreground and background feature maps onto a normal embedding space.

In FIG. 6, the foreground and background of the final feature maps F and $\bar{F}$ are encoded in dual branches with the original feature map X and the erased feature map $\bar{X}$, respectively. The foreground and background masks $M_{fg}$ and $M_{bg}$ are generated by setting intensity of the attention map $A_F$ generated through channel-wise pooling as a threshold value. Then, the foreground and background feature maps $F_{fg}$ and $F_{bg}$, obtained by multiplying the respective masks, are generated.

$$M_{fg} = \mathbb{1}[A_F > \tau_{fg}], M_{bg} = \mathbb{1}[A_F < \tau_{bg}]$$

$$F_{fg} = F \odot M_{fg}, F_{bg} = F \odot M_{bg}$$

Here, $\tau_{fg}$ and $\tau_{bg}$ are predefined threshold values. The respective foreground and background feature maps are projected into a normalized embedding space using a projection head. The respective foreground and background feature maps consist of two 1×1 convolutional layers with activation of Rectified Linear Unit (ReLU), and each of the respective foreground and background feature maps outputs 128-dimensional feature vectors $z_{fg}$, $z_{bg}$, $\bar{z}_{fg}$, and $\bar{z}_{bg}$. Officially, the contrastive guidance loss is given as below.

$$\mathcal{L}_{cg} = \{\max[\|(z_{fg} - \bar{z}_{fg})\|^2 - \|(z_{fg} - z_{bg})\|^2 + m, 0] + \max[\|(\bar{z}_{fg} - z_{fg})\|^2 - \|(\bar{z}_{fg} - \bar{z}_{bg})\|^2 + m, 0]\}$$

Here, m represents the margin. A loss function encourages reducing a distance between representations $z_{bg}$ and $\bar{z}_{fg}$ while increasing a distance between the backgrounds. Various complementary foregrounds may be mined within a full range of the target object.

Pairwise Non-Local Block (PNL)

In the present disclosure, the PNL component 450 is used to strengthen a pixel-by-pixel relationship with respect to a target object region in the final feature maps F and $\bar{F}$. An improved feature map to be provided to the contrastive guidance and the classifier are generated. A feature map $F \in R^{C \times H \times W}$ is projected as three 1×1 convolutional layers in {q, k, v} $\in R^{C \times H \times W}$ representing a query, a key, and a value, respectively. A weight matrix $W \in R^{HW \times HW}$ represents similarity between respective pixels obtained by a whitening dot-product operation of q, k.

$$W = \sigma((q_i - \mu_q)^T (k_j - \mu_k))$$

Here, σ is a softmax function, and $\mu_q$ and $\mu_k$ are the spatial averages of respective pixels l and j of q and k, respectively. Then, the improved feature map is generated as follows.

$$F' = F \oplus h(v \otimes W)$$

Here, $h(v \otimes W)$ denotes a 1×1 convolutional layer followed by batch normalization.

The PNL component 450 optimizes a normalized difference between query and key pixels and takes into consideration similarity of a region per class to learn a place where to attend. Accordingly, an informative clue is provided to the classifier and the contrastive guidance.

Hereinafter, efficiency of the new WSOL framework 400 proposed in the present disclosure is confirmed through extensive experiments much more than those of an existing method.

Experiment

1) Experimental Setup

Datasets

Methods proposed by two benchmarks CUB-200-2011 and ImageNet are evaluated, and only image-level labels are provided for training. CUB-200-2011 includes 200 kinds of bird consisting of 5,994 images for a training set and 5,794 images for a test set. ImageNet has 1,000 classes with 1.2 million images and 50,000 images for training and validation sets, respectively.

Evaluation Items

The methods are evaluated using Top-1 localization (Top-1 Loc), GT-known localization (GT-Loc) and Max-BoxAccV2. Top-1 Loc shows the proportion of correctly classified images including a bounding box of IoU of 0.5 or greater, along with a ground truth. GT-Loc measures the proportion at which a predicted box is considered correct if IoU is greater than 50%. MaxBoxAccV2 looks up an optimal threshold for generating the bounding box and averages the location identification performance at three IoU criteria 0.3, 0.5, and 0.7.

Details of Implementation

A method is implemented with three backbone networks: VGG16, InceptionV3, and ResNet50. All the networks start training by loading ImageNet pre-trained weights. The PNL and CG of the present disclosure are inserted before the classifier. A drop threshold value $\theta_d$ is set to 0.8 for a CUB data set and 0.9 for an ImageNet data set. Threshold values of the foreground $\tau_{fg}$ and the background $\tau_{bg}$ are set to 0.9 and 0.8 for VGG16. Only a scheduled region drop is utilized with the last drop threshold value to extract a complementary region.

2) Ablation Study

An ablation study for the proposed component is carried out with VGG16 on the CUB-200-2011 dataset.

Effect of Each Proposed Component

Three components for identifying a location of the entire target object are proposed. Table 1 below shows efficiency of individual elements in a framework.

TABLE 1

| Methods | SRD | CG | PNL | MaxBoxACCV2 (%) | | | | Top-1 Loc (%) |
| --- | --- | --- | --- | --- | --- | --- | --- | --- |
| | | | | 0.3 | 0.5 | 0.7 | Avg | |
| Ours | ✓ | ✓ | ✓ | 99.00 | 88.63 | 53.88 | 80.50 | 65.60 |
| SRD | x | ✓ | ✓ | 98.65 | 86.05 | 46.84 | 77.18 | 64.22 |
| CG | ✓ | x | ✓ | 98.29 | 83.07 | 41.58 | 74.31 | 62.67 |
| PNL | ✓ | ✓ | x | 98.58 | 86.78 | 47.26 | 77.54 | 63.98 |

In a case where there is no contrastive guidance (CG), performance 6.19% lower than that of the full setup in terms of MaxBoxAccV2 is achieved, and the performance is degraded by 12.30% especially at IoU 0.7. In order to identify the location of the entire object, it is necessary to provide a network with guidance about the background region of a given image. Erased feature map generation (SRD) also improves performance by 3.32%. Other components, except the PNL of the framework, causes performance degradation by 2.96%, and the PNL leads to the least performance degradation compared to the two components. As a result, the best performance is achieved when all the components are used.

Location and Size of SRD

First, the impact of a location to erase on performance is analyzed. As shown in Table 2 below, the best performance is shown when the SRD is inserted after the conv4_3 layer. However, in a case where the SRD is located in the initial layers pool2 and pool3, the performance is slightly degraded. This is because, as discussed in the previous study, a previous layer extracts a general feature and activates a part (e.g., an edge and a corner) that is distinguished as local in a feature map.

TABLE 2

| Location | MaxBoxAccV2 (%) | Top-1 Loc (%) |
| --- | --- | --- |
| conv4_3 | 80.50 | 65.60 |
| pool3 | 79.84 | 64.91 |
| pool2 | 78.91 | 64.89 |

In addition, in Table 3 below, performance according to a block size of an erased region is studied. The best performance is achieved when the drop threshold is set to 0.8 and the block size is set to 3. Performance is degraded because excessive information is erased from an original feature map.

TABLE 3

| | | block_size | | | |
| --- | --- | --- | --- | --- | --- |
| | | 1 | 3 | 5 | 7 |
| $O_{drop}$ | 0.8 | 77.5/64.4 | 80.5/65.6 | 77.3/64.1 | 68.2/55.3 |
| | 0.6 | 78.3/64.7 | 80.1/64.3 | 76.9/60.1 | 71.8/52.8 |
| | 0.4 | 79.3/64.9 | 78.9/62.3 | 69.8/52.2 | 56.6/38.8 |

Although the SRD of the present disclosure gradually increases an erased region, an erased branch may have difficulties in optimizing a constative guidance loss and a classification loss without sufficient clues about a target object.

Comparison Between Existing Contrastive Loss
(CG) and CG Proposed in the Present Disclosure Table 4 below shows the result of replacing a CG loss with the existing Constative loss (i.e., InfoNCE loss).

TABLE 4

| Methods | MaxBoxAccV2 (%) | | | | Top-1 Loc (%) |
| --- | --- | --- | --- | --- | --- |
| | 0.3 | 0.5 | 0.7 | Avg | |
| Ours (w/o CG) | 98.29 | 83.07 | 41.58 | 74.31 | 62.67 |
| Ours (w InfoNCE) | 98.44 | 86.38 | 48.88 | 77.90 | 63.46 |
| Ours† | 98.79 | 87.50 | 50.19 | 78.89 | 64.21 |
| Ours | 99.00 | 88.63 | 53.88 | 80.50 | 65.60 |

As a result of the experiment, the method of the present disclosure still outperforms the existing WSOL performance with a large margin of 7.7% even when the InfoNCE loss is used. However, the method of the present disclosure is much inferior to w/CG of the present disclosure (the last row) at IoU 0.7. In addition, performance of the present disclosure having no contrastive guidance loss is severely degraded at IoU 0.7. This shows that the contrastive guidance loss of the present disclosure provides adequate guidance to the network than the existing constative loss to cover the entire object well. In addition, the effect of dual-branching in constative learning (the third row) is verified. Ours⊚ uses only the background of the original feature map as a negative sample. It shows that if the background of the feature map is discarded, the performance is degraded. Consequently, the background of the erased feature map plays an important role in discovering a less distinct part by extending activation within the boundary of the target object.

3) Comparison with the Latest Method

The method of the present disclosure and the latest WSOL method for CUB-200-2011 and ImageNet data sets are compared in terms of MaxBoxAccV2, GT-known Loc, and Top-1 Loc.

Regarding MaxBoxAcv2, in Table 5 below, the method of the present disclosure outperforms all other methods for the CUB and ImageNet datasets in terms of MaxBoxAccV2 for the three backbones.

TABLE 5

| | CUB-200-2011 | | | | ImageNet | | | |
| --- | --- | --- | --- | --- | --- | --- | --- | --- |
| Methods | VGG | Inc | Res | Avg | VGG | Inc | Res | Avg |
| CAM [38] | 63.7 | 56.7 | 63.0 | 61.1 | 60.0 | 63.4 | 63.7 | 62.4 |
| HaS [26] | 63.7 | 53.4 | 64.7 | 60.6 | 60.6 | 63.7 | 63.4 | 62.6 |
| ACoL [36] | 57.4 | 56.2 | 66.5 | 60.0 | 57.4 | 63.7 | 62.3 | 61.2 |
| SPG [37] | 56.3 | 55.9 | 60.4 | 57.5 | 59.9 | 63.3 | 63.3 | 62.2 |
| ADL [6] | 66.3 | 58.8 | 58.4 | 61.1 | 59.8 | 61.4 | 63.7 | 61.7 |
| CutMix [35] | 62.3 | 57.5 | 62.8 | 60.8 | 59.4 | 63.9 | 63.3 | 62.2 |
| InCA [14] | 66.7 | 60.3 | 63.2 | 63.4 | 61.3 | 62.8 | 65.1 | 63.1 |
| MinMaxCAM [29] | 70.2 | — | 68.0 | — | 62.2 | — | 65.7 | — |
| Ours | 80.5 | 75.8 | 73.3 | 76.5 | 65.3 | 64.8 | 65.5 | 64.7 |

The present disclosure has achieved notable improvements in CUB (+13.1%) and ImageNet (+1.6%). In particular, the method of the present disclosure has improved by 15.5% over InCA of CUB-InceptionV3 and by 3.1% over MinMaxCAM of ImageNet-VGG16.

Regarding GT-known Loc and Top-1 Loc, Table 6 below shows the quantitative results obtained using an existing matrix.

TABLE 6

| Methods | Backbone | CUB-200-2011 GT-Loc | CUB-200-2011 Top-1 Loc | ImageNet GT-Loc | ImageNet Top-1 Loc |
|---|---|---|---|---|---|
| CAM | VGG16 | 56.00 | 44.15 | 57.72 | 42.80 |
| ACoL | VGG16 | 54.10 | 45.92 | 62.96 | 45.83 |
| ADL | VGG16 | 75.41 | 52.36 | — | 44.92 |
| MEIL | VGG16 | — | 57.46 | — | 46.81 |
| RCAM | VGG16 | 80.72 | 61.30 | 61.69 | 44.69 |
| GCNet | VGG16 | 81.10 | 63.24 | — | — |
| Ours | VGG16 | 88.54 | 65.60 | 65.04 | 48.01 |
| CAM | InceptionV3 | 55.10 | 43.70 | 62.68 | 46.30 |
| SPG | InceptionV3 | — | 46.64 | 64.69 | 48.60 |
| DANet | InceptionV3 | 67.70 | 52.52 | — | 47.53 |
| RCAM | GoogLeNet | 65.10 | 51.05 | 62.76 | 47.70 |
| GCNet | InceptionV3 | 75.30 | 58.58 | — | 49.10 |
| Ours | InceptionV3 | 87.95 | 64.72 | 66.86 | 50.63 |
| CAM | ResNet50 | — | 49.41 | 51.86 | 38.99 |
| CutMix | ResNet50 | — | 54.80 | — | 47.30 |
| ADL | ResNet50-SE | — | 62.29 | — | 48.53 |
| RCAM | ResNet50-SE | 74.51 | 58.39 | 64.40 | 51.96 |
| Ours | ResNet50 | 85.17 | 69.71 | 66.46 | 52.59 |

In both CUB and ImageNet datasets, the method of the present disclosure achieves state-of-the-art performance regarding GT-Loc and Top-1 Loc.

4) Qualitative Results

Figure 7:
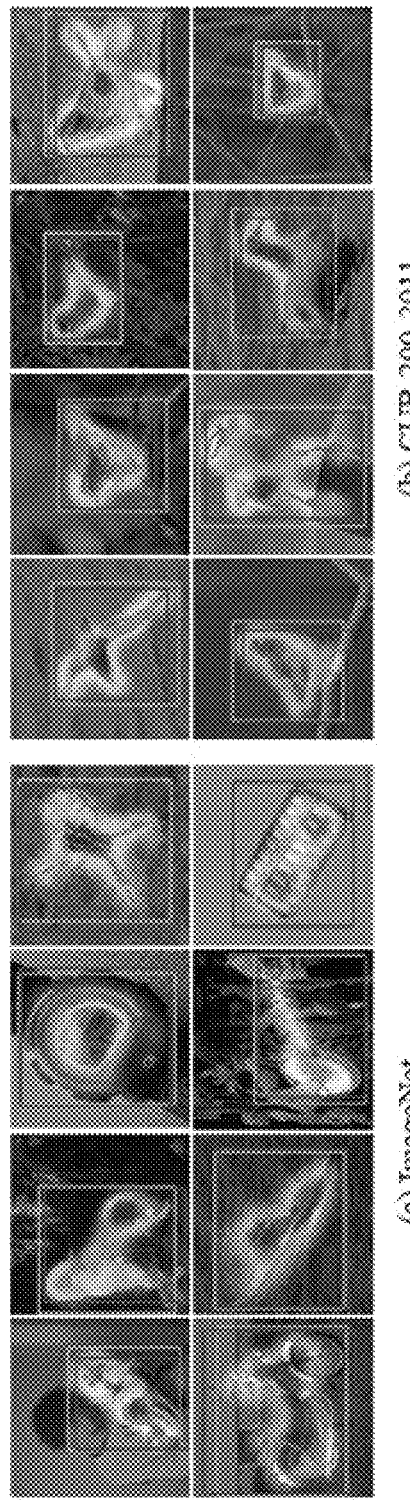
FIG. 7 is a diagram illustrating qualitative results for ImageNet and CUB-200-2011 datasets of a WSOL framework according to the present disclosure.

FIG. 7 is a diagram illustrating qualitative results for ImageNet and CUB-200-2011 datasets of a WSOL framework according to the present disclosure, in which an actual box is shown in red and a prediction box is shown in green.

In FIG. 7, the method of the present disclosure correctly identifies the location of the entire object and outputs a strict bounding box compared to the real world. In a training phase, the background region is limited using the SRD and the contrastive guidance loss. Thus, the method of the present disclosure inhibits activation in the background as well as extending to a less distinct region.

Figure 8:
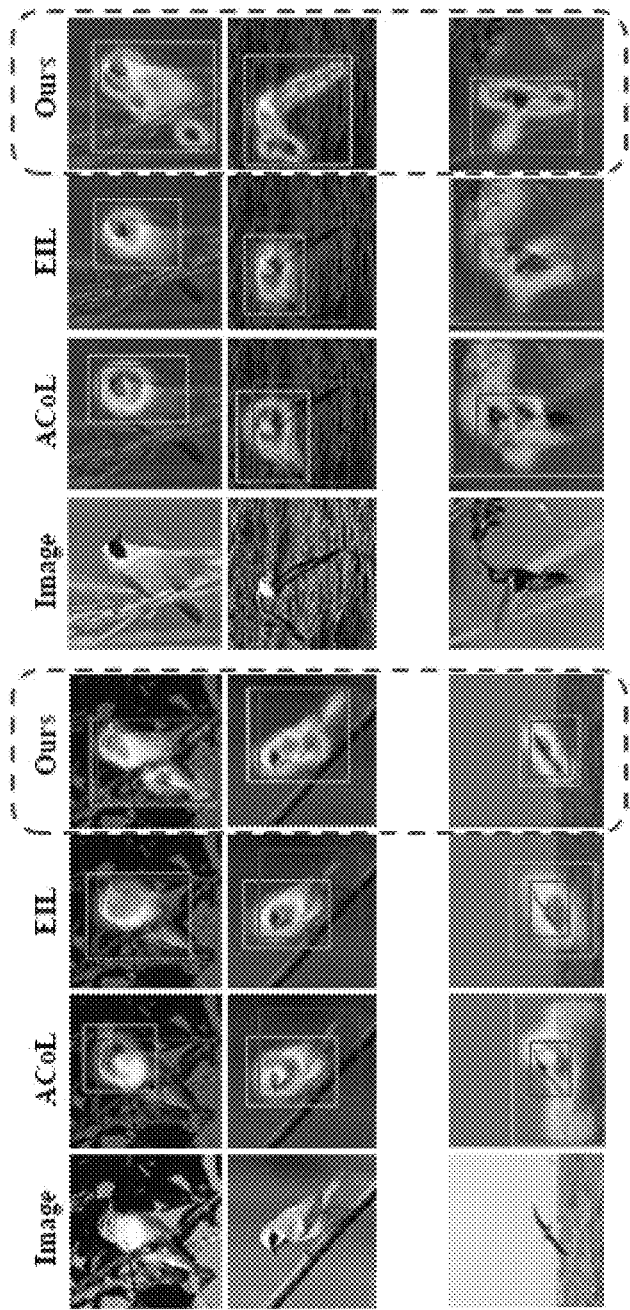
FIG. 8 is an exemplary diagram illustrating a result of weakly supervised object localization according to the present disclosure compared to an existing method.

FIG. 8 is an exemplary diagram illustrating a result of weakly supervised object localization according to the present disclosure compared to an existing method.

As shown in FIG. 8, the existing methods for weakly supervised localization for an image, i.e., ACoL and EIL, recognize only a most characteristic part of an object, or the existing methods recognizes even the background even when learning after erasing a most characteristic part to recognize a wider region of the object, and thus, too wide region is recognized, thereby the accuracy of object localization is low. On the other hand, the method of the present disclosure is able to detect a correct region of an object by locating the entire object and inhibits the background through an scheduled region drop (SRD) block which erases a wider region of a most characteristic part in the progress of learning, a constative guidance (CG) block which learns features of the foreground and background in a manner in which different regions in a final feature map and a final erased feature map, extracted from dual branches, are activated to divide the foreground and background of each feature map and then foregrounds are moved to close to each other while backgrounds are moved away from each other, and a pairwise non-local (PNL) block which provides a further improved feature map to CG and a classifier.

Although a preferred embodiment of the present disclosure has been described for illustrative purposes, those skilled in the art will appreciate that various modifications, additions and substitutions are possible, without departing from the scope and spirit of the present disclosure as disclosed in the accompanying claims.

DETAILED DESCRIPTION OF MAIN ELEMENTS

100: weakly supervised object localization apparatus
110: processor 130: memory
150: user input/output unit 170: network input/output unit
210: feature map generator 230: erased feature map generator
250: final map generator 270: contrastive guidance determiner
400: WSOL framework proposed in the present disclosure
410: scheduled region drop (SRD) component
430: contrastive guidance (CG) component
450: pair-wise non-local (PNL) component

What is claimed is:

1. A weakly supervised object localization apparatus comprising:
   a feature map generator configured to generate a feature map X by performing a first convolution operation on an input image;
   an erased feature map generator configured to generate an attention map A through the feature map X and generate an erased feature map −X by performing a masking operation on the input image through the attention map A;
   a final map generator configured to generate a final feature map F and a final erased feature map −F, respectively, by performing a second convolution operation on the feature map X and the erased feature map −X; and
   a contrastive guidance determiner configured to determine contrastive guidance for a foreground object in the input image based on the final feature map F and the final erased feature map −F,
   wherein the feature map generator, the erased feature map generator, the final map generator, and the contrastive guidance determiner are each implemented via at least one processor.

2. The apparatus of claim 1, wherein the erased feature map generator is further configured to generate the attention map A through channel-wise pooling of the feature map X.

3. The apparatus of claim 2, wherein the erased feature map generator is further configured to perform the masking operation on the input image by generating a mask for a most characteristic part in the attention map A.

4. The apparatus of claim 1, wherein the final map generator is further configured to activate different regions in the input image through the final feature map F and the final erased feature map −F so that the foreground object moves away from background.

5. The apparatus of claim 4, wherein the final map generator is further configured to generate foreground masks Mfg and −Mfg and background masks Mbg and −Mbg through attention maps AF and −AF that are based on channel-wise pooling of the final feature map F and the final erased feature map −F.

6. The apparatus of claim 5, wherein the final map generator is further configured to generate foreground feature maps Ffg and −Ffg and background feature maps Fbg and −Fbg based on the foreground masks Mfg and −Mfg and the background masks Mbg and −Mbg.

7. The apparatus of claim 6, wherein the final map generator is further configured to generate multidimensional feature vectors Zfg, Zbg, −Zfg, and −Zbg by projecting the foreground feature maps Ffg and −Ffg and the background feature maps Fbg and −Fbg onto a normal embedding space.

8. The apparatus of claim 4, wherein the final map generator is further configured to generate a key k, a query q, and a value v by performing a third convolution operation on the final feature map F and the final erased feature map −F, and improve performance of the final feature map F and the final erased feature map −F by performing a product operation of the key k, the query q, and the value v with a weight matrix W.

9. The apparatus of claim 1, wherein the contrastive guidance determiner is further configured to determine the contrastive guidance, so that a distance between foreground feature vectors Zfg and −Zfg is reduced while a distance between background feature vectors Zbg and −Zbg of respective foreground feature vectors Zfg and −Zfg among multidimensional feature vectors Zfg, Zbg, −Zfg, and −Zbg generated based on the final feature map F and the final erased feature map −F is increased.

10. A weakly supervised object localization method comprising:
- a feature map generating operation of generating a feature map X by performing a first convolution operation on an input image;
- an erased feature map generating operation of generating an attention map A through the feature map X and generating an erased feature map −X by performing a masking operation on the input image through the attention map A;
- a final map generating operation of generating a final feature map F and a final erased feature map −F, respectively, by performing a second convolution operation on the feature map X and the erased feature map −X; and
- a contrastive guidance determining operation of determining contrastive guidance for a foreground object in the input image based on the final feature map F and the final erased feature map −F.

11. The method of claim 10, wherein the erased feature map generating operation comprises:
- generating the attention map A through channel-wise pooling of the feature map X; and
- performing the masking operation on the input image by generating a mask for a most characteristic part in the attention map A.

12. The method of claim 10, wherein the final map generating operation comprises:
- generating foreground masks Mfg and −Mfg and background masks Mbg and −Mbg through attention maps AF and −AF that are based on channel-wise pooling of the final feature map F and the final erased feature map −F;
- generating foreground feature maps Ffg and −Ffg and background feature maps Fbg, −Fbg based on the foreground masks Mfg and −Mfg and the background masks Mbg and −Mbg; and
- generating multidimensional feature vectors Zfg, Zbg, −Zfg, and −Zbg by projecting the foreground feature maps Ffg and −Ffg and the background feature maps Fbg and −Fbg onto a normal embedding space.

13. The method of claim 10, wherein the final map generating operation comprises generating a key k, a query q, and a value v by performing a third convolution operation on the final feature map F and the final erased feature map −F, and improving performance of the final feature map F and the final erased feature map −F by performing a product operation of the key k, the query q, and the value v with a weight matrix W.

14. The method of claim 10, wherein the contrastive guidance determining operation comprises determining the contrastive guidance, so that a distance between foreground feature vectors Zfg and −Zfg is reduced while a distance between background feature vectors Zbg and −Zbg of respective foreground feature vectors Zfg and −Zfg among multidimensional feature vectors generated based on the final feature map F and the final erased feature map −F is increased.

* * * * *